United States Patent
Bihannic et al.

(10) Patent No.: US 12,074,758 B2
(45) Date of Patent: Aug. 27, 2024

(54) METHOD FOR CONFIGURING A TERMINAL DEVICE

(71) Applicant: Orange, Issy-les-Moulineaux (FR)

(72) Inventors: Nicolas Bihannic, Chatillon (FR); Olivier Le Grand, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/002,111

(22) PCT Filed: Jun. 15, 2021

(86) PCT No.: PCT/FR2021/051074
§ 371 (c)(1),
(2) Date: Dec. 16, 2022

(87) PCT Pub. No.: WO2021/255382
PCT Pub. Date: Dec. 23, 2021

(65) Prior Publication Data
US 2023/0308346 A1    Sep. 28, 2023

(30) Foreign Application Priority Data
Jun. 18, 2020   (FR) ........................................ 2006353

(51) Int. Cl.
*H04L 41/0806* (2022.01)
*H04L 9/40* (2022.01)

(52) U.S. Cl.
CPC ...... *H04L 41/0806* (2013.01); *H04L 63/0281* (2013.01)

(58) Field of Classification Search
CPC .......................... H04L 41/0806; H04L 63/0281
(Continued)

(56) References Cited

U.S. PATENT DOCUMENTS 7,831,693 B2 * 11/2010 Lai .................... H04L 67/02
709/218
9,197,600 B2 * 11/2015 L'Heureux ......... H04L 63/0471
(Continued)

FOREIGN PATENT DOCUMENTS

| FR | 3111512 A1 * | 12/2021 | ......... H04L 41/0806 |
| JP | 7074880 B2 * | 5/2022 | ............ G06F 9/5077 |
| WO | WO-2021037133 A1 * | 3/2021 | ............. H04L 41/04 |

OTHER PUBLICATIONS

3GPP TS 29.503, "5G; 5G System; Unified Data Management Services; Stage 3", version 15.2.1 Release 15, Apr. 2019.
(Continued)

*Primary Examiner* — Melvin H Pollack
(74) *Attorney, Agent, or Firm* — David D. Brush; Westman, Champlin & Koehler, P.A.

(57) ABSTRACT

Partners in an entity increasingly need to obtain information about data relating to communications of a terminal. A configuration method and a configuration device configure a terminal device able to be connected to a slice of a communication network. The slice is instantiated so as to route data between the terminal device and a service device in accordance with at least one routing criterion. The method is implemented by management equipment for managing the terminal device and able to communicate with the terminal device. The method includes storing a configuration context of the terminal device in memory, and transmitting, to the terminal device, a configuration message including the identifier of a proxy connection device and the identifier of the network slice.

13 Claims, 5 Drawing Sheets

(58) Field of Classification Search
USPC .......................................................... 709/220
See application file for complete search history.

(56) References Cited

U.S. PATENT DOCUMENTS

| | | | | |
|---|---|---|---|---|
| 9,496,971 | B2* | 11/2016 | Edge | H04W 40/246 |
| 10,819,148 | B2* | 10/2020 | Warren | F24F 11/30 |
| 11,271,818 | B2* | 3/2022 | Zhang | H04L 41/5051 |
| 11,330,593 | B2* | 5/2022 | Furuichi | H04W 4/08 |
| 11,368,898 | B2* | 6/2022 | Karapantelakis | H04W 4/70 |
| 11,431,695 | B2* | 8/2022 | Tan | H04L 63/0815 |
| 11,452,032 | B2* | 9/2022 | Gupta | H04W 52/0261 |
| 11,468,095 | B2* | 10/2022 | Li | G06F 16/22 |
| 11,477,834 | B2* | 10/2022 | Ke | H04W 24/10 |
| 11,496,475 | B2* | 11/2022 | Harguindeguy | H04L 63/1425 |
| 11,540,337 | B2* | 12/2022 | Wang | H04W 36/0027 |
| 11,558,789 | B2* | 1/2023 | Ke | H04W 36/0069 |
| 11,568,305 | B2* | 1/2023 | Negi | G06F 21/602 |
| 11,601,991 | B2* | 3/2023 | Lu | H04W 76/10 |
| 11,729,782 | B2* | 8/2023 | Zhang | H04W 52/242 |
| | | | | 370/336 |
| 11,757,543 | B2* | 9/2023 | Chervyakov | H04B 17/345 |
| | | | | 370/252 |
| 11,778,514 | B2* | 10/2023 | Zheng | H04L 45/56 |
| | | | | 370/329 |
| 11,792,290 | B2* | 10/2023 | Chen | H04L 67/12 |
| | | | | 709/203 |
| 11,811,694 | B2* | 11/2023 | Mondal | H04L 5/0023 |
| 2007/0201359 | A1 | 8/2007 | Matsubara et al. | |
| 2011/0208864 | A1* | 8/2011 | St. Laurent | H04L 47/70 |
| | | | | 709/226 |
| 2018/0359644 | A1 | 12/2018 | Shimizu et al. | |
| 2022/0116848 | A1* | 4/2022 | Tsokkinen | H04L 45/302 |
| 2022/0132372 | A1* | 4/2022 | Narasimha | H04W 28/0808 |
| 2022/0141719 | A1* | 5/2022 | Shan | H04W 36/26 |
| | | | | 370/331 |
| 2022/0141738 | A1* | 5/2022 | Chou | H04W 28/0268 |
| | | | | 455/437 |
| 2022/0159501 | A1* | 5/2022 | Chou | H04L 41/122 |
| 2022/0191733 | A1* | 6/2022 | Ali | H04W 4/46 |
| 2022/0201524 | A1* | 6/2022 | Ying | H04W 74/0866 |
| 2022/0256436 | A1* | 8/2022 | Guo | H04W 40/36 |
| 2023/0041056 | A1* | 2/2023 | Bordeleau | H04L 41/046 |
| 2023/0048066 | A1* | 2/2023 | Lei | H04W 12/72 |

OTHER PUBLICATIONS

International Standard, "Security for industrial automation and control systems—Part 4-2: Technical security requirements for IACS components", IEC 62443-4-2 of the International Electrotechnical Commission (IEC), Edition 1.0, dated Feb. 2019, ISBN 978-2-8322-6597-0.

Otto Boris et al., "Reference Architecture Model for the Industrial Data Space", In Cooperation with Industrial Data Space Association, Jan. 1, 2017 (Jan. 1, 2017), pp. 1-83, Retrieved from the Internet: https://www.fit.fraunhofer.de/content/dam/fit/en/documents/Industrial-Data-Space_Reference_Architecture-Model-2017.pdf, XP055782433.

International Search Report dated Sep. 24, 2021 for corresponding International Application No. PCT/ FR2021/051074, filed Jun. 15, 2021.

Written Opinion of the International Searching Authority dated Sep. 24, 2021 for corresponding International Application No. PCT/FR2021/051074, filed Jun. 15, 2021.

English translation of the Written Opinion of the International Searching Authority dated Sep. 24, 2021 for corresponding International Application No. PCT/FR2021/051074, filed Jun. 15, 2021.

Otto Boris et al, "Reference Architecture Model for the Industrial Data Space in Cooperation With", Jan. 1, 2017 (Jan. 1, 2017), p. 1-83, Retrieved from the Internet: https://www.fit.fraunhofer.de/content/dam/fit/en/documents/Industrial-Data-Space_Reference-Architecture-Model-2017.pdf, XP055782433.

"3rd Generation Partnership Project; Technical Specification Group Core Network and Terminals; 5G System; Network Data Analytics Services; Stage 3 (Release 16) ", vol. CT WG3, No. V16.3.0, Mar. 27, 2020 (Mar.27, 2020), p. 1-83, 3GPP Standard; Technical Specification; 3GPP TS 29.520, 3rd Generation Partnership Project (3GPP), Mobile Competence Centre; 650, Route Des Lucioles; F-06921 Sophia-Antipolis Cedex; France, Retrieved from the Internet: ftp://ftp.3gpp.org/Specs/archive/29_series/29.520/29520-g30.zip295202-g30.doc, XP051861164.

* cited by examiner

[Fig. 1]
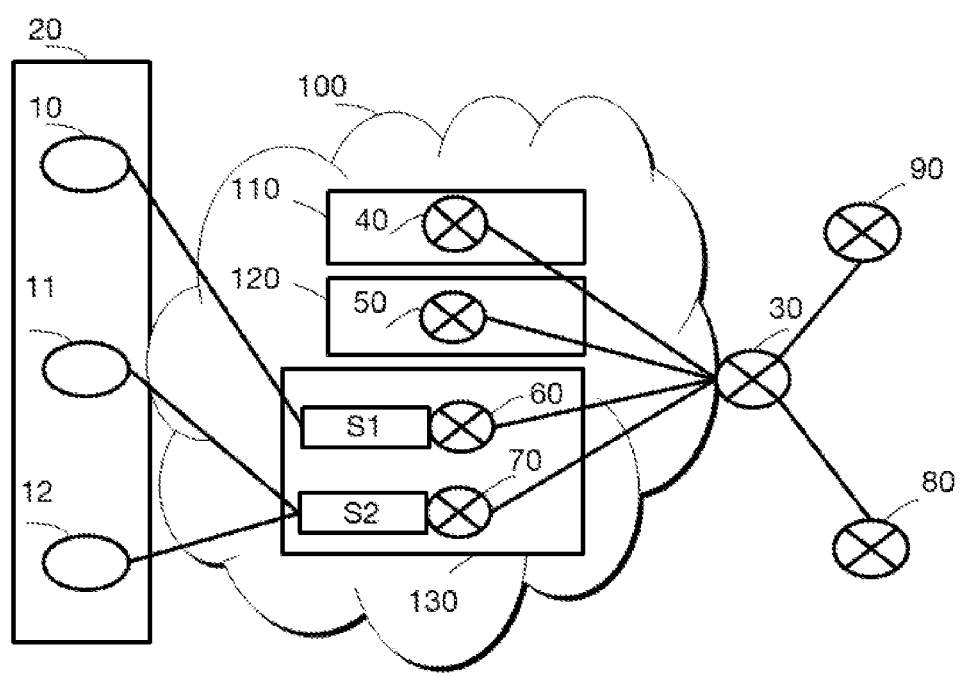

[Fig. 2]
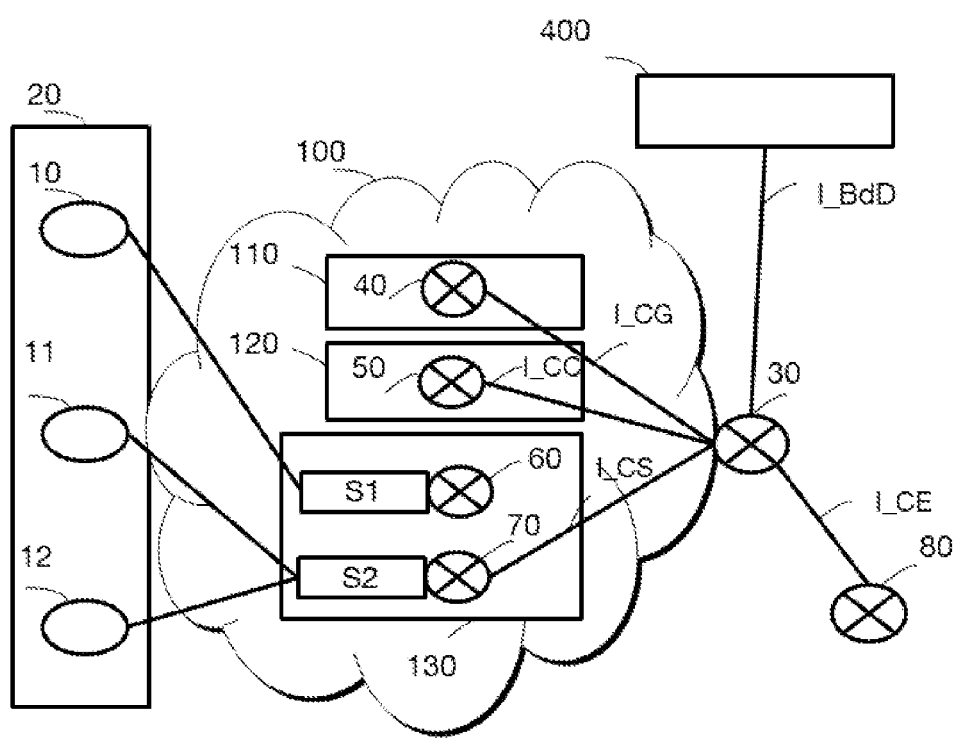

[Fig 3]
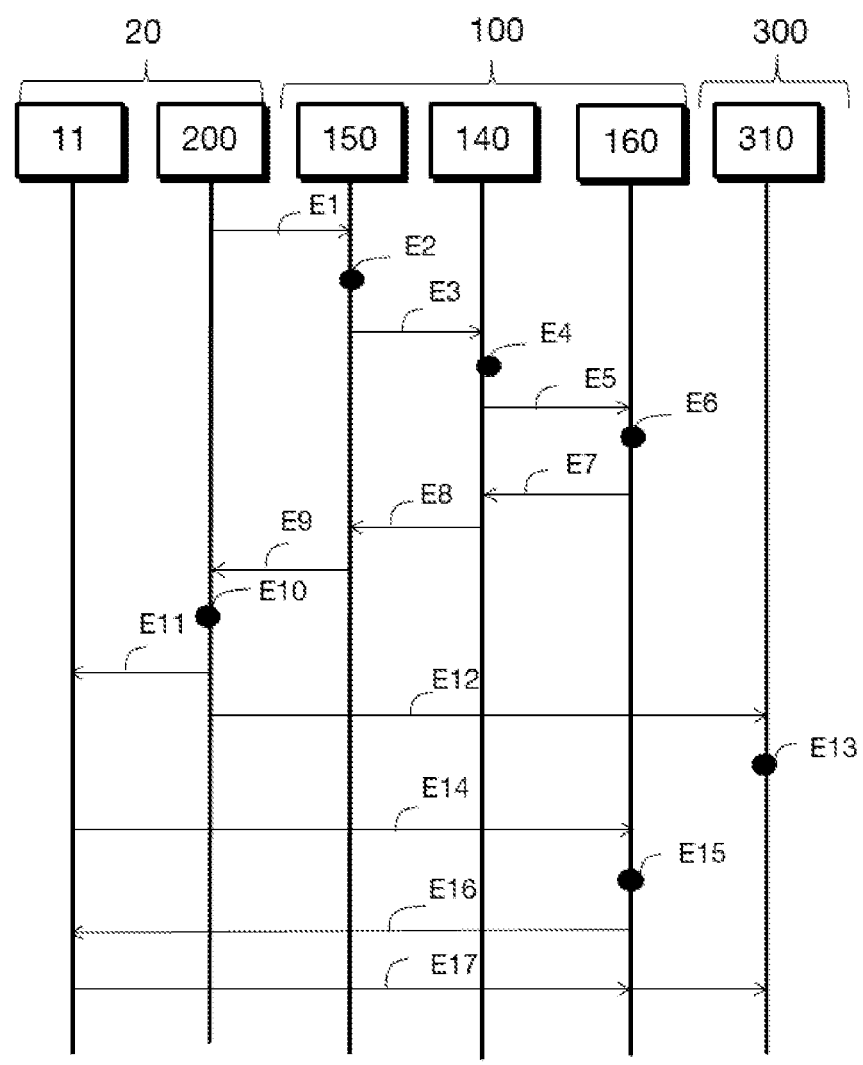

[Fig 4]
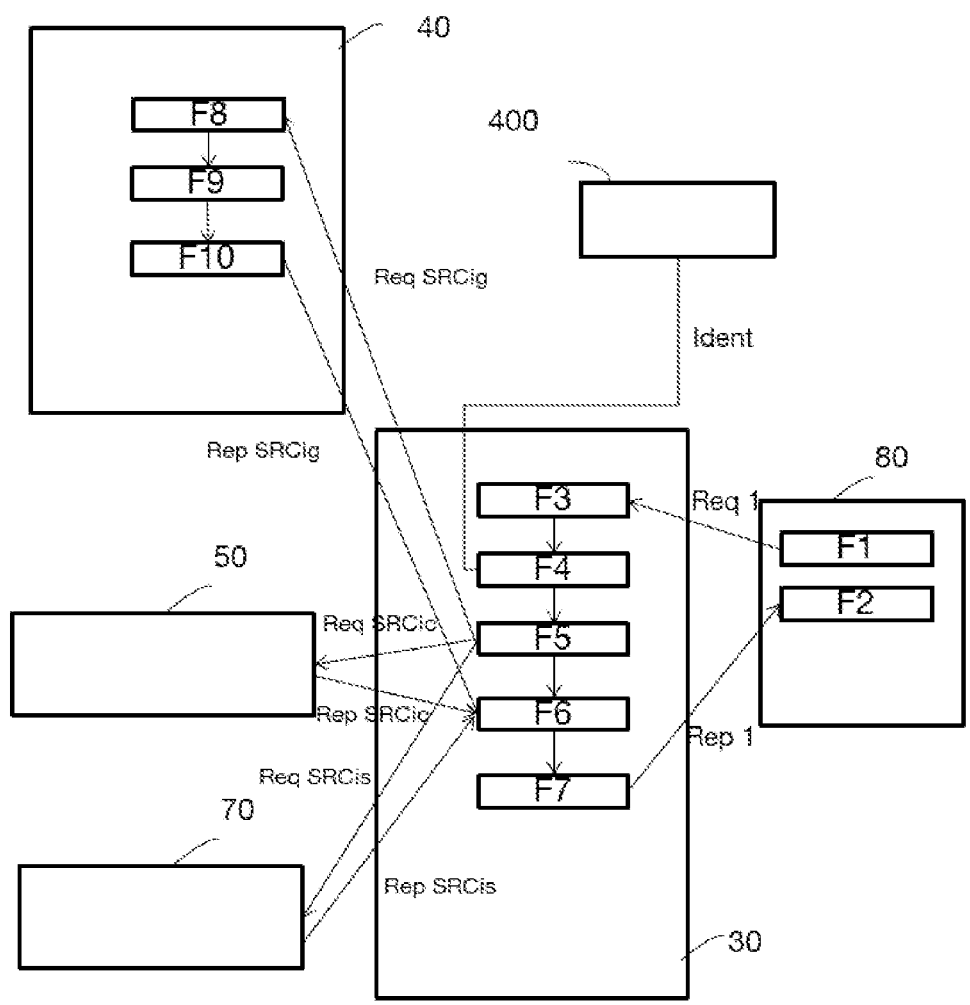

[Fig 5]
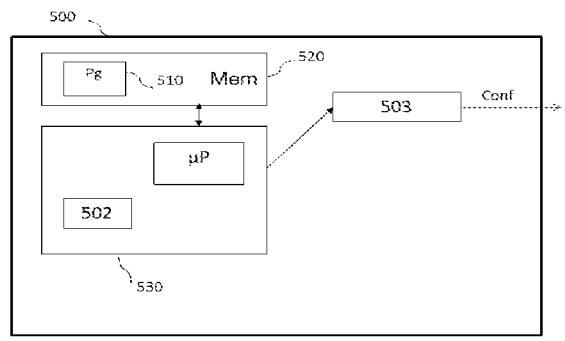
[Fig 6]
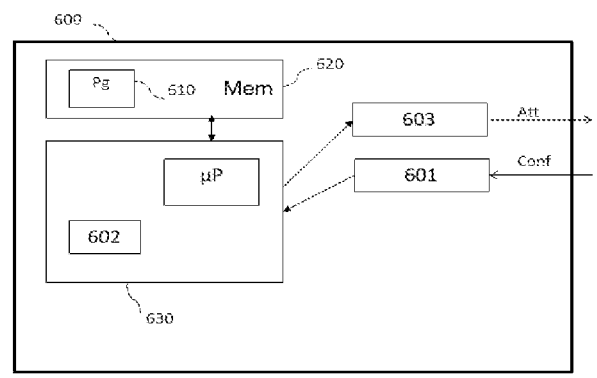

METHOD FOR CONFIGURING A TERMINAL DEVICE

1. CROSS-REFERENCE TO RELATED APPLICATION

This application is a Section 371 National Stage Application of International Application No. PCT/FR2021/051074, filed Jun. 15, 2021, the content of which is incorporated herein by reference in its entirety, and published as WO 2021/255382 on Dec. 23, 2021, not in English.

2. TECHNICAL FIELD

The invention relates to the configuration of a terminal device for a connection to a communication network structured into slices which are associated with a service, a terminal type, or a quality-of-service criterion. The invention aims to associate a proxy connection device with the terminal device so as to be able to correlate and aggregate information relating to the data exchanged between the terminal device and a service device over a network slice.

3. BACKGROUND

A service, notably an industrial one, is increasingly based on an interaction between job processes and processes specific to communication networks. The service therefore requires the contribution of various players thus forming an ecosystem.

Now, confidence in the exchanges of data between partners of an ecosystem is increasingly required and needed. This applies to all economic sectors such as industry, health, banking services, etc.

Also observed is the development of the modeling of physical infrastructures as digital twins. This modeling notably aims to achieve better efficiency in operational processes by digitizing a service, a machine or a production line. This digital twin provides for improving the activities of simulation, testing and problem-solving. "Digital twin" modeling however must be the most accurate and reliable possible, and demands that the data used for this modeling is not corrupt or obsolete.

The need for consistency between the real world and its digital representation becomes a major stake in the integration and development of new or existing services. This alliance of the physical and the digital has given rise to the neologism "Phygital", as a contraction of "Physical" and "Digital", and opens up opportunities of services and usage scenarios for the B2B (Business to Business) and B2C (Business to Consumer) sectors, notably in the framework of the preparation for the development of fifth-generation (5G) infrastructures for mobile communications networks.

Initiatives have proposed solutions to enable secure data exchanges, notably in an industrial context.

Thus, a reference architecture model (https://www-.fit.fraunhofer.de/content/dam/fit/en/documents/Indus trial-Data-Space_Reference-Architecture-Model-2017.pdf) has been proposed by the Fraunhofer Institute. This model comprises various functional blocks needed to secure and track the exchanges of data between a source entity "data source" and a destination entity "data sink" via the implementation of "connectors" in the forwarding plane for this data, and of control entities "app store" and "broker", the respective purposes of which are:

the "app store" supplies the applications which will be downloaded and executed in the connectors;

the "broker" manages a metadata register for having the information available and able to be communicated within this data space.

Furthermore, in the international standard IEC 62443-4-2 of the International Electrotechnical Commission (IEC) (https://webstore.iec.ch/preview/info_iec62443-4-2%7Bed1.0%7Db.pdf), the use of security gateways (equivalent to connectors), for secure data transfer, is described.

However, these documents do not specify the operations to be implemented in order to interconnect the security gateway with terminals, including industrial terminals in factories. These operations can be complex and involve not only an interconnection in the forwarding plane for sending industrial data, but also an interconnection in the network management plane and in the network control plane in order that the security gateway can share network context data in addition to data directly issued from industrial terminals. Thus, this improves, for example, the implementation of a digital twin by virtue of taking into account various items of information relating to an exchange of data between a terminal, notably an industrial one, and a correspondent terminal.

An object of the present invention is to bring about improvements over the prior art.

4. SUMMARY

The invention arrives at improving the situation using a method for configuring a terminal device able to be connected to a slice of a communication network, said slice being instantiated to route data between the terminal device and a service device in accordance with at least one routing criterion, the method being implemented by management equipment for the terminal device able to communicate with the terminal device and comprising:

the storing into memory of a configuration context for the terminal device, the context containing a group of identifiers of connection devices for connection of the terminal device to the communication network, one of the identifiers corresponding to an identifier of a proxy connection device able to aggregate data relating to the terminal device from the other connection devices of the group, an identifier of the network slice and an identifier of the terminal device, the transmission, to the terminal device, of a configuration message containing the identifier of the proxy connection device and the identifier of the network slice.

A terminal device, such as industrial equipment or a user terminal, connects to a communication network and transmits data to a service device, such as an application server or other industrial equipment, using several connection devices, also called connectors or security gateways. These connection devices intervene to route data exchanged between the terminal device and the service device, and also to manage metadata relating to the routed data, as indicated previously. Thus, the connection devices can be in the forwarding plane, in the network control plane or even in the network management plane. The method thus provides for communicating to the terminal device only a single identifier of a connection device, called a proxy connection device, this device providing the interfacing between the various devices involved in the routing of data. Thus, when the terminal device connects to the communication network, and notably to a slice of the communication network, the single identifier of the proxy connection device enables the management equipment receiving the connection request to identify the various connection devices needed for the connection by virtue of the terminal device identifier and the proxy connection device identifier. The method also allows the communication network manager to be able to update its communication network by replacing, adding or removing connection devices without informing the terminal device. Furthermore, for a group of terminal devices of a local area network, a specific proxy connection device can be associated with each terminal device using this method. This also means that the various terminal devices, depending on the type of application used by these terminal devices, the performance of these devices and the security needs of these terminal devices, can have a suitable number and type of connection devices. This adaptation can also provide for associating the proxy connection devices and the type or number of connection devices with the network slice or slices used to route data from the terminal device.

According to one aspect of the configuration method, the configuration context additionally contains security data associated with each connection device of the group. The configuration context is notably used by communication network equipment, a terminal device or a third-party entity to obtain data relating to a session between a terminal device and a service device. The security data for connection devices is used to determine a level of confidence in the data provided by these devices and/or to identify the security level that can be established between the proxy connection device and the other connection devices, and even to determine whether the security data is suitable for the network slice used for the transfer of data between the terminal device and the service device.

According to another aspect of the configuration method, the connection devices of the group form part of one or more planes of the communication network from among:
  the forwarding plane
  the management plane
  the control plane.

The data aggregated by the proxy device is data exchanged between the terminal device and the service device, therefore relating to the forwarding plane, but also control plane data, such as location data for the terminal device or data indicating an attachment status of the terminal device. The data can also be management data. The management plane connection device is able to transmit data such as performance data or data about availability of communication network equipment.

According to another aspect of the invention, the configuration method additionally comprises the transmission, to a management entity for the service device, of a notification message containing the identifier of the terminal device and the identifier of the proxy connection device.

The method is advantageous for informing the service device manager of the proxy connection device. Thus, the entity managing the service device which seeks to have statistics relating to the routing of data exchanged with the terminal device over the communication network slice does not have to communicate with each connection device and therefore does not have to know their identifiers. On the other hand, it might obtain information aggregated by the proxy device, thereby avoiding the need to aggregate the information itself as a function of the identifier of the terminal device and/or of the network slice. Furthermore, this avoids the need to communicate the architecture of the communication network comprising the various connection devices to a third-party entity, represented here by the management entity.

According to another aspect of the configuration method, the notification message additionally contains a security parameter used by the management entity for the service device to communicate with the proxy connection device.

The notification message can advantageously contain a security parameter, corresponding to a security protocol and/or a security key and/or a security level used for the communication between the management entity and the proxy connection device. This parameter provides for improving the security of information in a communication network when in communication with a third party, this security parameter being able to be associated with the terminal device and/or with the network slice.

According to another aspect of the invention, the configuration method comprises, prior to the storing into memory, the transmission, to an administration entity for the communication network, of a request for connection of the terminal device, the request containing the identifier of the terminal device, and the at least one routing criterion relating to the required network slice.

The method can advantageously be implemented upon request by the management entity for the terminal device. The management entity for the device thus transmits a connection request containing the elements required to associate connection devices, including a proxy connection device, corresponding to the quality-of-service, security and routing criteria contained in the connection request.

According to another aspect of the invention, the configuration method additionally comprises the reception, from an administration entity for the communication network, of a validation message containing the identifier of the terminal device, the identifier of the network slice, the group of identifiers of the connection devices involved in the routing of the data, the group including the identifier of the proxy connection device.

Advantageously, the configuration method comprises, prior to the storing of the configuration context, the information specific to this context, including connection device identifiers, among which is an identifier of a proxy connection device. It is to be noted that the validation message can arise following the reception of a connection request or even independently of this reception, notably when the group of connection devices is updated.

The configuration method can advantageously be implemented by access equipment for the local area network to which the terminal device is attached. The access equipment can be a router, an access gateway, or a home gateway, also referred to as a "box". The method can also be implemented in management equipment for an operator network or monitoring equipment for such a network.

The various aspects of the configuration method which have just been described can be implemented independently from one another or in combination with one another.

The invention relates also to a method for attaching a terminal device to a slice of a communication network, said slice being able to route the data between the terminal device and a service device in accordance with at least one routing criterion, implemented by the terminal device and comprising:
  the reception, from management equipment for the terminal device, of a configuration message containing an identifier of a proxy connection device and an identifier of the communication network slice,
  the configuration of a profile for connection to the network slice containing an identifier of a proxy connection device and an identifier of the communication network slice the transmission, to an attachment entity for the communication network, of an attachment message containing an identifier of the terminal device, the received proxy connection identifier and the received network slice identifier.

According to one aspect of the invention, the attachment method additionally comprises the reception of an attachment acceptance message if the attachment entity validates the association between the identifier of the terminal device, the identifier of the network slice and the identifier of the proxy connection device.

The information received from the terminal device, which the latter has itself received from its management entity, is used to validate or invalidate its attachment. The attachment entity can compare the identifiers received with identifiers transmitted by the entity administering the communication network.

The various aspects of the attachment method which have just been described can be implemented independently from one another or in combination with one another. The invention relates also to a configuration device for a terminal device able to be connected to a slice of a communication network, said slice being instantiated to route data between the terminal device and a service device in accordance with at least one routing criterion, comprising
- a database, able to store into memory a configuration context for the terminal device, the context containing a group of identifiers of connection devices for connection of the terminal to the communication network, one of the identifiers corresponding to an identifier of a proxy connection device able to aggregate data relating to the terminal device from other connection devices of the group, an identifier of the network slice and an identifier of the terminal device,
- a transmitter, able to transmit to the terminal device a configuration message containing the identifier of the proxy connection device and the identifier of the network slice.

This device, able to implement in all its embodiments the configuration method that has just been described, is intended to be implemented in a device of a communication network such as local area network access equipment, such as a home gateway, a terminal or router equipment.

The invention relates also to a device for attaching a terminal device to a slice of a communication network, said slice being able to route data between the terminal device and a service device in accordance with at least one routing criterion, comprising:
- a receiver, able to receive, from management equipment for the terminal device, a configuration message containing an identifier of a proxy connection device and an identifier of the communication network slice,
- a configurator, able to configure a profile, for connection to the network slice, containing an identifier of a proxy connection device and an identifier of the communication network slice
- a transmitter, able to transmit, to an attachment entity for the communication network, an attachment message containing an identifier of the terminal device, the received proxy connection identifier and the received network slice identifier.

This attachment device, with the attachment method that has just been the described being able to be implemented in all its embodiments, is intended to be implemented in a terminal, such as a sensor, industrial equipment (machine, control station, etc.) or any type of device able to communicate with a communication network by virtue of a wired or wireless network.

The invention relates also to a system for configuring a terminal device able to be connected to a slice of a communication network, comprising:
- management equipment for the terminal device, comprising a configuration device
- an attachment device.

The invention relates also to computer programs including instructions for implementing steps of the respective configuration and attachment methods which have just been described, when these programs are both executed by a processor, and a recording medium that can be read by a configuration device and an attachment device respectively, on which the computer programs are recorded.

The abovementioned programs can use any programming language and be in the form of source code, object code or a code intermediate between source code and object code, such as in a partially compiled form or in any other desirable form.

The abovementioned data media can be any entity or device capable of storing the program. For example, a medium can include a means of storage such as a ROM, for example a CD-ROM or a microelectronic circuit ROM, or a magnetic recording means. Such storage means can for example be a hard disk, a flash memory, etc.

On the other hand, the data medium can be a transmittable medium such as an electrical or optical signal, which can be conveyed via an electrical or optical cable, via radio or via other means. A program according to the invention can in particular be downloaded over an Internet type network.

Alternatively, a data medium can be an integrated circuit in which a program is incorporated, the circuit being suitable for executing or for being used in the execution of the methods in question.

5. BRIEF DESCRIPTION OF THE DRAWINGS

Other features and advantages of the invention will become clearer upon reading the following description of particular embodiments, which are given by way of simple illustrative and nonlimiting examples, and from the appended drawings in which:

FIG. 1 presents an architecture of a communication network in which the configuration method is implemented according to a first aspect of the invention, FIG. 2 presents an architecture of a communication network in which the configuration method is implemented according to a second aspect of the invention, FIG. 3 presents an implementation of the configuration method according to one embodiment of the invention, FIG. 4 presents an implementation of the configuration method according to another embodiment of the invention, FIG. 5 presents a configuration device according to one embodiment of the invention, FIG. 6 presents an attachment device according to one embodiment of the invention.

6. DESCRIPTION OF ILLUSTRATIVE EMBODIMENTS

Hereafter in the description, embodiments of the invention in one communication architecture are described. This architecture can be implemented to route communications data to fixed or mobile terminals and the architecture, deployed using dedicated equipment or virtualized functions, can be intended to route and process residential or business customer data.

Reference is first made to [FIG. 1] which presents an architecture of a communication network in which the configuration method is implemented according to a first aspect of the invention.

In this architecture, a factory 20 comprises three items of industrial equipment 10, 11, 12, also identified as terminal devices. This industrial equipment 10, 11, 12 can equally be machines, control consoles, computer or smartphone type communication equipment or any other type of equipment able to communicate with a party via a communication network 100. The communication network 100 can be fixed or mobile infrastructure administered by one or more operators, the operator also able to be the manager of the factory 20. The communication network 100 is made up of three planes 110, 120, 130. The plane 110 is a management plane comprising equipment and services for managing or administering the communication network 100. Thus, the equipment of the network 100 is administered by specific management-plane equipment, and the services implemented by the network 100 are themselves administered by functions and equipment in the management plane 110. The management plane 110 routes management data. The communication network 100 further comprises a control plane 120. The control plane 120 groups together equipment and services connected with the data routing protocols in the communication network 100. The plane 120 further comprises equipment and services for implementing management of the quality of service of data routed over the network 100 as well as a billing of these data services. The plane 120 transports signaling data. The communication network 100 further comprises a forwarding plane 130, also referred to as "data plane" 130 or "user plane" 130. The forwarding plane 130 routes application data, also referred to as payload traffic or payload data, transmitted or received by the industrial equipment 10, 11, 12 or by applications installed in this industrial equipment 10, 11, 12. The management plane 110 comprises one or more connection devices 40 tasked with routing management data in the communication network. The routed management data is related to payload data routed in the data plane 130 and/or to an industrial device 10, 11, 12 transmitting or receiving this payload data. The connection device 40 can be an administration server, a security gateway in the management plane 110 or equipment tasked with routing management data in the management plane 110. In a corresponding way, the control plane 120 comprises one or more connection devices 50 tasked with routing control data in the control plane 120. The connection device 50 can be of the same type as the device 40, except that it routes data in the control plane 120. The data plane 130 also comprises one or more data-plane connection devices 60, 70. This data plane 130 is further characterized by the implementation of network slices, comprising equipment and/or services, tasked with routing data requiring the same type of processing in terms of routing performance and quality of service in particular. Thus, all the data, for example video data, will be routed over the same network slice while text data may be routed over another network slice. The communication operator 100 can deploy as many network slices as necessary and can associate the slices with terminal devices, applications, quality-of-service characteristics or routing criteria other than those mentioned above. It is considered that the industrial equipment 11 and 12 transmit and receive data over a slice S2 in the data plane 130 of the communication network 100, and that the industrial equipment 10 transmits and receives data over a slice S1 in the data plane 130 of the communication network 100. The data in the slice S1 is routed via the connection device 60 and the data in the slice S2 is routed via the connection device 70. The devices 60 and 70 can be of the same type as the connection devices 40 and 50. The connection devices 40, 50, 60, 70 of the various planes (management, control, data) are connected to a proxy connection device 30. This proxy connection device 30, according to one alternative, can be deployed in the communication network 100. This proxy connection device 30 is furthermore connected to the connection devices 80 and 90. These connection devices 80 and 90 route for example data to partners of the factory 20 to which data transmitted and received from the industrial equipment 10, 11, 12 is routed. For example, they can be connection devices of other factories or companies working with the factory 20 or even entities tasked with auditing the factory 20. The connection devices 80 and 90 can themselves be proxy connection devices for other connection devices of the entity exchanging data with the industrial equipment 10, 11, 12 of the factory 20. The proxy device 30 can be of the same type as the devices 40, 50, 60, 70 and exhibit interest in enabling exchanges of data between the devices 40, 50, 60, 70 and the external entities comprising the devices 80, 90 while reducing the number of connections between the respective connection devices and limiting security problems in the network 100 in relation to external entities, the proxy connection device 30 acting as a security gateway. Furthermore, the connection device 30 is implemented so as to mask the topology of the network 100 from the devices 90 and 80. Specifically, in the absence of the device 30, each device 80 and 90 of the external entities relative to the network 100 and to the factory 20 would need to exchange data with the various devices 40, 50, 60, 70 in the planes (management, control, data) of the communication network 100.

With reference to [FIG. 2], an architecture of a communication network in which the configuration method is implemented according to a second aspect of the invention is presented.

This architecture adopts the same equipment, devices and network as in [FIG. 1]. In this case, the connection devices are identified as connectors.

The communication network 100 has two network slices (Slice S1 and Slice S2) to connect the terminal devices 10, 11 and 12 of the factory 20 to the external environment (or external "data space"). The devices 11 and 12 use the same network slice, Slice S2, since they have same characteristic for the exchange of data to the outside, unlike the device 10 (sensor) which uses another network slice, Slice S1. The characteristics of the data exchange which justify the setup of network slices can for example be data volumetry or the sensitivity level of the industrial data.

A relay connector 30 is implemented to interconnect the internal connectors of the network 100 as a single external interface to the external environment. This relay connector 30 acts as an external connector relative to external entities. This relay connector 30 has the following interface configuration:

The interface I_CS interconnects the relay connector 30 with at least one internal connector 70 specific to the slice S2. It is assumed that the association connector 70—Slice S2 is a 1-to-1 relationship, i.e. one slice is associated with one connector, in this case the connector 70. The interface I_CC interconnects the relay connector 30 with the internal connector 50 in the control plane 120. The interface I_CG interconnects the relay connector 30 with the internal connector 40 in the management plane 110. The interface I_CE interconnects the relay connector 30 with an external connector 80. With this interface I_CE, the internal topology of the operator's network and notably the network slice architecture deployed are masked. The interface I_BdD interconnects the relay connector 30 with a database 400 which stores network level context data, such as the association of at least one identifier of the slice (Slice S2) to which the devices 11, 12 are attached.

The network architecture of the internal connectors 40, 50, 70, of the relay connector 30, and of the database 400 form an equivalent of a data space internal to the operator of the network 100. Specifically, this architecture enables the relay connector 30 to be a consumer of data supplied by the internal connectors 40, 50, 70 via the interfaces I_CG, I_CC and I_CS. Furthermore, the database 400 also acts as "internal broker" to enable the relay connector 30 to be informed of the internal connectors 40, 50, 70 to be contacted in order to collect this context data of the terminal devices 11, 12.

Reference is now made to [FIG. 3], which presents an implementation of the configuration method according to one embodiment of the invention.

The factory 20 comprises a terminal device 11, as described in [FIG. 1] and [FIG. 2] under the term "industrial equipment", and management equipment 200 for the terminal device 11. This equipment can be an access router, a gateway (also referred to as a "box"), or even an administration entity for a communication network of the factory 20. The communication network 100 comprises an administration entity 150 for the communication network 100 and an entity 160 for attachment to the communication network 100 for the data plane. According to an example, the administration entity 150 is a management station for the communication network 100 such as a manager connecting to the data space of the network 100, and the attachment entity 160 is access equipment, such as a gateway for a mobile network (GGSN (Gateway GPRS Support Node), PDN-GW (Packet Data Network Gateway), UPF (User Plane Function)) or equivalent equipment for a fixed network (BRAS (Broadband Remote Access Server), BNG (Broadband Network Gateway)). The network 100 further comprises equipment 140 for managing the resources of the communication network 100. An industrial partner 300 of the factory 20 is also present in [FIG. 3]. The partner 300 notably comprises an entity 310 for managing a service device not represented in [FIG. 3], this service device exchanging data with the terminal device 11 of the factory 20 through a slice of the communication network 100, the slice not represented in [FIG. 3].

During a step E1, the management equipment 200 for the terminal device 11 transmits, to an administration entity 150 for the communication network 100, a connection request notably containing information identifying the terminal 11, the type of network slice and notably the quality-of-service characteristics required, as well as a security level for the required connection. The factory 20 thus indicates the security level desired for the data transfer from the terminal device 11. According to one example, the security level can correspond to security levels as defined in the document IEC 62443 (https://webstore.iec.ch/preview/info_iec62443-4-2%7Bed1.0%7Db.pdf).

During a step E2, the administration entity 150 chooses the connection devices (40, 50, 70), the type of proxy connection device 30, and the associated interfaces (I_CG, I_CC, I_CS, I_CE). The connection devices are not represented in [FIG. 3] but are presented in FIG. 1 and [FIG. 2].

The security and capacity demands are notably considered in the choice of the connection devices present in the inventory of the database 400 for connection to an external data space (represented here by the industrial partner 300). During a step E3, the administration entity 150 transmits, to a resource management entity 140 of the network 100, a deployment request containing the following information: identifier of the terminal device 11, type of network slice required, and list of connection devices. This deployment request applies to the implementation of the network slice and to the architecture of connection devices and of the proxy connection device of step E2. During a step E4, the resource management entity 140 checks that the resources required for the terminal device 11 are readily available, such as those present in the request received during step E3. Resource availability concerns the connectivity, computation and storage resources to implement network connectivity based on network slices and the architecture of the selected connectors.

During a step E5, if the resources are readily available, the resource management entity 140 transmits, to an attachment entity 160 for the communication network 100, a configuration instantiation request. This request contains an identifier of the terminal device 11, the type of network slice required and the list of connection devices such as those identified during step E2. If the resources are not available, an error message or configuration failure message is transmitted to the management equipment 200. The aim of this step is to request the deployment followed by the configurations of the network elements (including the network slices) forming the forwarding plane (or data plane), control plane and management plane, as well as the architecture of the selected connectors. During a step E6, the attachment entity 160 for the network 100 saves the configuration context for each terminal device. This context, as held by the attachment entity 160, contains the identifier of the terminal device 11, the identifier of the slice implemented or used for the routing of data between the terminal device 11 and a service device of the partner 300, the identifiers of the connection devices, including the identifier of the proxy connection device. The context can also contain security data associated with the connection devices, and data relating to the planes (forwarding, control, management) of the respective connection devices. The context data is recorded in the database 400 (or internal broker as indicated in [FIG. 2]) and hence provides for linking, for a given terminal device, the network information associated with it: at least one identifier of the slice which is associated with it, at least one identifier of the connection device in the forwarding plane, the identifier of the proxy connection device, the properties of the connection devices in terms of security, capacity, interface with the proxy connection device and also the selected security level. This context data is typically stored at control plane level in a UDM (Unified Data Management) type database (according to the specification 3GPP TS 29.503 "5G System; Unified Data Management Services; Stage 3").

During a step E7, the attachment entity 160 transmits an acceptance message containing the context information saved by the attachment entity 160. This acceptance message is transmitted to the resource management equipment 140 when the configurations of the network equipment and of the connection devices are effective for the terminal device 11. During a step E8, the resource management equipment 140 transmits, to the network administration entity 150, a settings message containing an identifier of the terminal device 11, the identifier of the network slice implemented for data routing, and the identifiers of the connection devices and of the proxy connection device. This message is transmitted as a response to the deployment request transmitted during step E3 and indicates the network slice identifier and the identifiers of the connection devices allocated to the terminal device 11.

During a step E9, the network administration entity 150 transmits, to the management equipment 200 for the terminal device 11, a validation message containing the identifiers received during step E8. This validation message is transmitted as a response to the connection request transmitted during step E1. This message, according to one example, contains security data associated with the respective connection identifiers as well as a security level implemented by the operator of the network 100 for the network slice. The security data can be a security protocol used, or a type of security key to use. Moreover, this message indicates the architecture of the connection devices by virtue of the type of proxy connection device deployed.

During a step E10, the management equipment for the terminal device 11 stores the configuration context into memory. This context contains the network slice identifier, the identifier of the terminal device 11, and a group of identifiers of connection devices relating to the terminal device 11, including the identifier of the proxy connection device providing the interface between the terminal device 11 and the connection devices of external partners. These identifiers, implemented and communicated by the operator of the communication network 100, are for example recorded in a database of the management equipment 200. The identifiers of the connection devices can be identifiers of devices in the data plane and/or the control plane and/or the management plane of the communication network 100. If security data is received during step E10, or if the management equipment 200 is informed of this security data independently, the configuration context can then, according to one example, contain security data associated with the connection devices.

During a step E11, the management equipment 200 transmits, to the terminal device 11, a configuration message containing the identifier of the proxy connection device and the identifier of the network slice routing the data from the terminal device 11. The configuration message thus enables the terminal device 11 to exchange data with a service device. This information is used by the terminal device for the configuration of a network slice connection profile containing the identifier of a proxy connection device and the communication network slice identifier. According to one example, this profile can also contain the identifiers of connection devices involved in the routing of data over the network slice, if the identifiers are transmitted to the terminal device during step E11. During a step E12, the management equipment 200 for the terminal device 11 transmits, to a management entity 310 for a service device with which the device 11 is capable of communicating, a notification message containing the identifier of the terminal device 11 and the proxy connection device identifier. Thus, the factory 20 notifies all its industrial partners, including the partner 300, of information relating to the proxy connection devices, including the proxy connection device for the terminal 11. The notification message, according to one alternative, contains a security parameter (security protocol to be used to communicate with the proxy connection device, type of security key to use for the communication, whether or not data exchanged with the proxy connection device is encrypted, etc.) associated with any communication with the proxy connection device. Furthermore, with this notification message, the factory 20 can notify a broker in the case of an external data space being implemented by the operator of the network 100.

During a step E13, the management entity 310 saves the context for each terminal device with the information relating to the terminal device identifier, the proxy connection device identifier and possibly with the associated security parameter. Each industrial partner of the factory 20 and/or "external" broker notified during step E12 stores in their internal databases the information relating to the terminal device 11, which information is received during step E12.

During a step E14, and following the information received during step E11, the terminal device 11 transmits, to the entity 160 for attachment to the network 100, a message of attachment to the network 100. The attachment message contains the identifier of the terminal device 11, the network slice identifier and the proxy connection device identifier. This information is sufficient for the attachment entity 160 to be able to respond to the attachment message. The identifier of the terminal device 11 can be obtained for example from the source address used to send the attachment message to the attachment entity 160. During a step E15, the attachment entity 160 checks the information received from the terminal device 11. It checks the validity of the attachment request by checking the association of the identifier of the terminal device 11 with the network slice identifier indicated and the proxy connection device identifier transmitted. This check is carried out by consulting an internal database and based on data saved during step E6.

During a step E16, the attachment entity 160 validates the association between the identifiers of the terminal device 11, of the network slice and of the proxy connection device, and transmits an acceptance message to the terminal device 11. If the association is not valid, for example because there is no association between the identifiers received, the attachment entity 160 will transmit to the terminal device 11 a connection request failure message, leaving for example the possibility of the transmission of a new connection request.

During a step E17, the terminal device 11 transmits data relating to one or more applications, over the identified network slice, to a service device via a data transmission. This exchange of data is possible once the terminal device 11 has attached to the attachment entity 160 for the network 100.

The identifier of the terminal device 11 can equally be an IP, IPv4 and/or Ipv6 address, an FQDN (Fully Qualified Domain Name) identifier, or any identifier allowing recognition by the operator of the network 100 and the partner 300. The identifier of the network slice can be any sequence of alphanumeric characters allowing recognition by the entities involved in the configuration method. The identifier of a connection device can be a MAC address, an IP address, an FQDN identifier, or any sequence of alphanumeric characters. With reference to [FIG. 4], an implementation of the configuration method according to another embodiment of the invention is presented. The entities represented in [FIG. 4] correspond to the entities in the previous drawings when they are identified in an identical manner.

Initially, a connection device 80 of a partner, for example the partner 300 in [FIG. 3], transmits, during a step F1, a request Req 1 which corresponds to an access request for data relating to a terminal device Beta of a company Alpha, not represented in [FIG. 4]. In response to this request Req 1, the operator of a network must identify and collect various items of data corresponding to a network context relating to this terminal device. The request can consist in gathering the various data relating to a communication session between a terminal device and one or more service devices of a partner for which the connection device 80 transmits the request Req 1.

The proxy connection device 30 receives the request Req 1 during step F3. The proxy connection device 30 queries the database 400 (or internal broker of the communication network) by transmitting a message Ident to the database 400 to become informed of the network connection devices in charge of context data relating to the request Req 1 and notably the identifier of the connection device in the data plane terminating the network slice for the exchange of data between the terminal device Beta and the service device(s). The database 400 in return transmits, to the proxy connection device 30, identifiers of the connection devices 40, 50, 70.

The proxy connection device 30 transmits during a step F5 respective requests Req SRCig, Req SRCic and Req SRCis to the connection devices 40, 50, 70 in the management, control and forwarding (or data) planes of the communication network. The request Req SRCis relates to the forwarding plane and enables the terminal device Beta (sensor, machine, computer, etc.) to provide the data expected by the external connector 80. The requests Req SRCig and Req SRCic are for retrieving network context data relating to the management plane and to the control plane. For the management plane, this is for example performance or alarm data for the network equipment involved in the connectivity of the terminal device to the communication network. For the control plane, this is for example data on the location, billing or status of attachment of the terminal device to the network. Furthermore, the number of requests sent to connection devices is saved, for example by a request aggregation module.

The connection device 40 receives the request Req SRCig during step F8. At step F9, the device 40 analyses the request and identifies the information required by the proxy connection device 30 based on information on the terminal device Beta, the identifier of the network slice used for the data transmission, or even the identifier of the service device with which the terminal device Beta exchanges data, and optionally a session identifier. At step F10, the connection device 40 transmits the identified data to the proxy connection device 30 in a response Rep SRCig. Similarly, the devices 50 and 70 perform tasks corresponding to tasks F8 to F10 and transmit the data in messages Rep SRCic and Rep SRCis to the proxy connection device 30.

The proxy connection device 30 receives and aggregates the data received during step F6, and optionally checks if the number of responses received matches the number of requests transmitted. Based on this aggregated data, the proxy connection device 30 establishes, during a step F7, a consolidated response containing all the context information for the management, control and forwarding planes for the data exchanged by the terminal device Beta over a communication network slice with one or more service devices. It transmits this response Rep 1 to the connection device 80 of the partner which transmitted the request during step F1. The device 80 receives this response during step F2 and can thus exploit it.

Thus the device 80 has solicited only the proxy connection device, possibly in a secure manner, without having knowledge of the various connection devices 40, 50, 70 involved in the management, control and routing of data.

With reference to [FIG. 5], a configuration device according to one embodiment of the invention is presented.

The configuration device 500 implements the configuration method, for which various embodiments have just been described. The configuration device 500 can be implemented in a device of a communication network such as local area network access equipment, such as a home gateway, a terminal or router equipment.

For example, the device 500 comprises a processing unit 530, equipped for example with a microprocessor µP, and driven by a computer program 510, stored in a memory 520 and implementing the configuration method according to the invention. Upon initialization, the code instructions of the computer program 510 are for example loaded into a RAM memory before being executed by the processor of the processing unit 530.

Such a device 500 comprises:
  a database 502, able to store into memory a configuration context for the terminal device, the context containing a group of identifiers of connection devices for connection of the terminal device to the communication network, one of the identifiers corresponding to an identifier of a proxy connection device able to aggregate data relating to the terminal device from the other connection devices of the group, an identifier of the network slice and an identifier of the terminal device,
  a transmitter 503, able to transmit to the terminal device a configuration message Conf containing the identifier of the proxy connection device and the identifier of the network slice.

With reference to [FIG. 6], an attachment device according to one embodiment of the invention is presented.

The attachment device 600 implements the attachment method, for which various embodiments have just been described. This attachment device 600 can be implemented in a terminal, such as a sensor, industrial equipment (machine, control station, etc.) or any type of device able to communicate with a communication network by virtue of a wired or wireless network.

For example, the device 600 comprises a processing unit 630, equipped for example with a microprocessor and driven by a computer program 610, stored in a memory 620 and implementing the attachment method according to the invention. Upon initialization, the code instructions of the computer program 610 are for example loaded into a RAM memory before being executed by the processor of the processing unit 630.

Such a device 600 comprises:
  a receiver 601, able to receive, from management equipment for the terminal device, a configuration message Conf containing an identifier of a proxy connection device and an identifier of the communication network slice,
  a configurator 602, able to configure a network slice connection profile containing the received proxy connection device identifier and the received communication network slice identifier
  a transmitter 603, able to transmit, to an attachment entity for the communication network, an attachment message Att containing an identifier of the terminal device, the configured proxy connection device identifier and the configured network slice identifier. Although the present disclosure has been described with reference to one or more examples, workers skilled in the art will recognize that changes may be made in form and detail without departing from the scope of the disclosure and/or the appended claims.

The invention claimed is:
1. A configuration method comprising:
  configuring a terminal device able to be connected to a slice of a communication network, said slice being instantiated to route data between the terminal device and a service device in accordance with at least one routing criterion, the configuring being implemented by management equipment for the terminal device, the management equipment being able to communicate with the terminal device and an administration entity for the network, the configuring comprising:

receiving from the administration entity and the storing into memory a configuration context for the terminal device, the context containing a group of identifiers of connection devices for connecting the terminal device to the communication network, one of the identifiers corresponding to an identifier of a proxy connection device able to aggregate data relating to the terminal device from the other connection devices of the group, an identifier of the network slice, associated with the proxy connection device and the other connection devices, and an identifier of the terminal device; and transmitting, to the terminal device, a configuration message containing the identifier of the proxy connection device and the identifier of the network slice, said configuration message enabling exchange of data between the terminal device and the service device via the proxy connection device.

2. The configuration method, as claimed in claim 1, wherein the configuration context additionally contains security data associated with each connection device of the group.

3. The configuration method, as claimed in either claim 1, wherein the connection devices of the group form part of one or more planes of the communication network from among:
   a forwarding plane;
   a management plane;
   a control plane.

4. The configuration method, as claimed in claim 1, additionally comprising transmitting, to a management entity for the service device, a notification message containing the identifier of the terminal device and the identifier of the proxy connection device.

5. The configuration method, as claimed in claim 4, wherein the notification message additionally contains a security parameter, used by the management entity for the service device, to communicate with the proxy connection device.

6. The configuration method, as claimed in claim 1, additionally comprising, prior to the storing into memory, transmitting, to the administration entity for the communication network, a request for connection of the terminal device, the request containing the identifier of the terminal device and the at least one routing criterion relating to the network slice.

7. The configuration method, as claimed in claim 1, additionally comprising receiving, from the administration entity for the communication network, a validation message containing the identifier of the terminal device, the identifier of the network slice, the group of identifiers of the connection devices involved in the routing of the data, the group including the identifier of the proxy connection device.

8. An attachment method comprising:
   attaching a terminal device to a slice of a communication network, said slice being able to route the data between the terminal device and a service device in accordance with at least one routing criterion, the attaching being implemented by the terminal device and comprising:
   receiving, from management equipment for the terminal device, a configuration message containing an identifier of a proxy connection device able to aggregate data exchanged between the terminal device and the service device, and an identifier of the slice of the communication network,
   configuring a profile for connection to the network slice containing the received identifier of the proxy connection device and the received identifier of the slice of the communication network, and
   transmitting, to an attachment entity for the communication network, an attachment message containing an identifier of the terminal device, the configured identifier of the proxy connection device and the configured identifier of the network slice.

9. The attachment method, as claimed in claim 8, additionally comprising receiving an attachment acceptance message if the attachment entity validates an association between the identifier of the terminal device, the identifier of the network slice and the identifier of the proxy connection device.

10. A configuration device for a terminal device able to be connected to a slice of a communication network, said slice being instantiated to route data between the terminal device and a service device in accordance with at least one routing criterion, able to communicate with the terminal device and an administration entity for the network, the configuration device comprising:
    a receiver;
    a transmitter;
    a database in a memory of the configuration device;
    a processor; and
    a non-transitory computer readable medium comprising instructions stored thereon which when executed by the processor configure the configuration device to:
    use the receiver to receive, from the network administration entity, a configuration context for the terminal device, the context containing a group of identifiers of connection devices for connection of the terminal device to the communication network, one of the identifiers corresponding to an identifier of a proxy connection device able to aggregate data relating to the terminal device from the other connection devices of the group, an identifier of the network slice, associated with the proxy connection device and the other connection devices, and an identifier of the terminal device,
    store into the database the received configuration context for the terminal device, and
    use the transmitter to transmit to the terminal device a configuration message containing the identifier of the proxy connection device and the identifier of the network slice, said configuration message enabling exchange of data between the terminal device and the service device via the proxy connection device.

11. A device for attaching a terminal device to a slice of a communication network, said slice being able to route data between the terminal device and a service device in accordance with at least one routing criterion, the device for attaching being implemented in the terminal device and comprising:
    a receiver;
    a transmitter;
    a processor; and
    a non-transitory computer readable medium comprising instructions stored thereon which when executed by the processor configure the device for attaching to:
    use the receiver to receive, from management equipment for the terminal device, a configuration message containing an identifier of a proxy connection device, able to aggregate data exchanged between the terminal device and the service device, and an identifier of the communication network slice,
configure a profile, for connection to the network slice, containing the proxy connection device identifier and the communication network slice identifier, and
use the transmitter to transmit, to an attachment entity for the communication network, an attachment message containing an identifier of the terminal device, the received proxy connection identifier and the received network slice identifier.

12. A non-transitory computer-readable medium comprising instructions a computer program stored thereon including instructions for implementing a configuration method when the program is executed by a processor of a configuration device, which is able to communicate with the terminal device and an administration entity for the network, wherein the method comprises:

configuring a terminal device able to be connected to a slice of a communication network, said slice being instantiated to route data between the terminal device and a service device in accordance with at least one routing criterion, the configuring comprising:
receiving from the administration entity and the storing into memory a configuration context for the terminal device, the context containing a group of identifiers of connection devices for connecting the terminal device to the communication network, one of the identifiers corresponding to an identifier of a proxy connection device able to aggregate data relating to the terminal device from the other connection devices of the group, an identifier of the network slice, associated with the proxy connection device and the other connection devices, and an identifier of the terminal device; and
transmitting, to the terminal device, a configuration message containing the identifier of the proxy connection device and the identifier of the network slice, said configuration message enabling exchange of data between the terminal device and the service device via the proxy connection device.

13. A non-transitory computer-readable medium comprising instructions a computer program stored thereon including instructions for implementing an attachment method when the program is executed by a processor of a terminal device, wherein the method comprises:

attaching the terminal device to a slice of a communication network, said slice being able to route the data between the terminal device and a service device in accordance with at least one routing criterion, the attaching comprising:
receiving, from management equipment for the terminal device, a configuration message containing an identifier of a proxy connection device able to aggregate data exchanged between the terminal device and the service device, and an identifier of the slice of the communication network,
configuring a profile for connection to the network slice containing the received identifier of the proxy connection device and the received identifier of the slice of the communication network, and
transmitting, to an attachment entity for the communication network, an attachment message containing an identifier of the terminal device, the configured identifier of the proxy connection device and the configured identifier of the network slice.

\* \* \* \* \*